(12) United States Patent
Mansur

(10) Patent No.: US 6,192,448 B1
(45) Date of Patent: Feb. 20, 2001

(54) STRUCTURE AND METHOD FOR DISK DRIVE SIZING USING A DISK DRIVE CONTROLLER COUPLED TO A COMPUTER SYSTEM

(75) Inventor: Al Mansur, Westminster, CO (US)

(73) Assignee: International Business Machines Corporation, Armonk, NY (US)

( * ) Notice: Under 35 U.S.C. 154(b), the term of this patent shall be extended for 0 days.

(21) Appl. No.: 09/136,643

(22) Filed: Aug. 18, 1998

(51) Int. Cl.$^7$ .................................................. G06F 12/00

(52) U.S. Cl. ........................... 711/112; 711/113; 711/172

(58) Field of Search ..................................... 711/112, 113, 711/172

(56) References Cited

U.S. PATENT DOCUMENTS 5,864,679 * 1/1999 Kanai et al. ......................... 709/238

* cited by examiner

Primary Examiner—Reginald G. Bragdon
(74) Attorney, Agent, or Firm—Flehr Hohbach Test Albritton & Herbert LLP

(57) ABSTRACT

A disk controller and associated method where conventional disk drive size files stored in the host computer are replaced with a drive size list maintained in the disk drive device controller. The disk size list structure permits the controller to do the disk drive sizing and provides a simplified list of disk drive size ranges that can be applied to all disk drives on the system regardless of disk drive make, model, or manufacturer. A disk drive size list can be generated from the existing disk drive configuration and maintained and updated with a minimum of user interaction.

24 Claims, 3 Drawing Sheets

STRUCTURE AND METHOD FOR DISK
DRIVE SIZING USING A DISK DRIVE
CONTROLLER COUPLED TO A COMPUTER
SYSTEM

FIELD OF THE INVENTION

This invention relates generally to hard disk driving sizing in a computer system, and more particularly to structure and method for sizing and resizing disk drives in a disk drive array coupled to a computer system.

BACKGROUND OF THE INVENTION

In conventional RAID controllers in conjunction with a host computer system, a disk drive sizing file is located on the host computer to which the RAID controller is connected. The file is used by a configuration tool running on the host to artificially reduce the physical capacity of all the disk drives identified in the drive sizing file. This artificial size reduction has the benefit of allowing drives with similar sizes to appear as the same size and therefore allowing the drives which may not have identical storage capacities or sizes to appear to have the same capacity or size and therefore better serve as spares for a broader range of disk drives. For example, the Global Array Manager or GAM (made by Mylex of Fremont Calif.), the RAIDfx (made by Mylex of Fremont, Calif.) and DACCF (made by Mylex of Fremont, Calif.) configuration tools, all use this method for drive sizing although the drive sizing files have somewhat different formats.

While this conventional manner of disk drive sizing provides the aforementioned functionality, the conventional method and structure have several problems, disadvantages, and limitations. First, the Drive Sizing File must be edited, by hand, properly, whenever a new type or model of disk drive is added to the computer system. The drive information that is added to the drive sizing File typically includes the disk drive vendor, model, version and the artificial size. This information must be typed into the file in precisely the right place and in precisely the right format, or it will be misinterpreted and cause serious problems. The vendor model and version information may typically be taken from an inquiry command's data retrieved from the particular new drive.

A second problem is that the artificial size values for each disk drive entered in the drive sizing file must be coordinated to match among all the like sized drives.

A third problem relates to the use of wildcard entries which may be permitted in certain of the drive sizing file fields. Even though wildcards may typically be allowed in some fields of the drive sizing file, it is still easy to make a mistake in the placement of the wildcard character or the non-wildcard characters that goes undetected. Entry and correction of actual parameters, or of wildcard characters or parameters, therefore remains a high risk operation, since erroneous entry or erroneous correction of a prior error might require a reconfiguration of possibly the entire controller.

A fourth problem or limitations is that because the drive sizing file is stored on the host computer, the conventional method involves a manual operation to update the drive sizing file onto each host computer system. Some Drive Sizing Files have thirty or more entries. The added work involved with entering and/or modifying the drive sizing file for large sites or for a user having multiple sites imposes undesirable maintenance to enter, modify, update, and/or maintain the drive sizing files.

A fifth limitation of some, but not all, configuration tools, including for example, the GAM configuration tool, is that they require the host computer system to be rebooted in order for changes in the Drive Sizing File to take effect. This is a severe maintenance problem for users and involves host down time during which the system and the data stored on the system is unavailable to users.

A sixth problem with the conventional drive sizing file method is that some controllers, such as certain Mylex External Products Division controllers and controllers made by others, cannot use a drive sizing file of conventional type. For example, the Mylex DAC9605X controllers' local configuration tool, accessed via an LCD front panel on the controller enclosure, does not and cannot take advantage of the Drive Sizing File, and it is not possible to add a new, differently sized type of drive into an array via the front panel configuration tool and have its size be artificially reduced.

Finally, it is noted that although some of the problems associated with conventional methodology may be circumvented, such circumvention where possible, requires expert user interaction to properly use a new drive type and enter its sizing data.

For these and other reasons, there remains a need for a new structure and method for sizing or resizing disk drives generally, and in particular in the environment of disk drives connected in an array, such as in a Redundant Array of Independent Disk (RAID) controller.

SUMMARY OF THE INVENTION

The invention is directed to structure and method for sizing and/or resizing disk drives in a disk drive array coupled to a computer system. The invention replaces conventional drive size files typically stored on a host computer with a drive size list maintained in the disk drive device controller. The drive size list structure and method permit the controller to do the disk drive sizing and provides a simplified list of disk drive size ranges that can be applied to all disk drives on the system regardless of disk drive make, model, or manufacturer. The invention advantageously permits a disk size list to be generated from the existing disk drive configuration, and further permits the disk size list to be maintained and/or updated with a minimum of user interaction. Additionally, the inventive structure and method reduce the required skill level of those users or administrators charged with maintaining a disk based data processing or computer system. In another aspect, the invention also provides a data structure within a memory in the disk drive controller.

DETAILED DESCRIPTION OF EMBODIMENTS
OF THE INVENTION

We now describe an inventive structure and method for disk drive sizing and resizing using a Drive Size list on-board the controller which overcomes the afore described problems and limitations.

Figure 1:
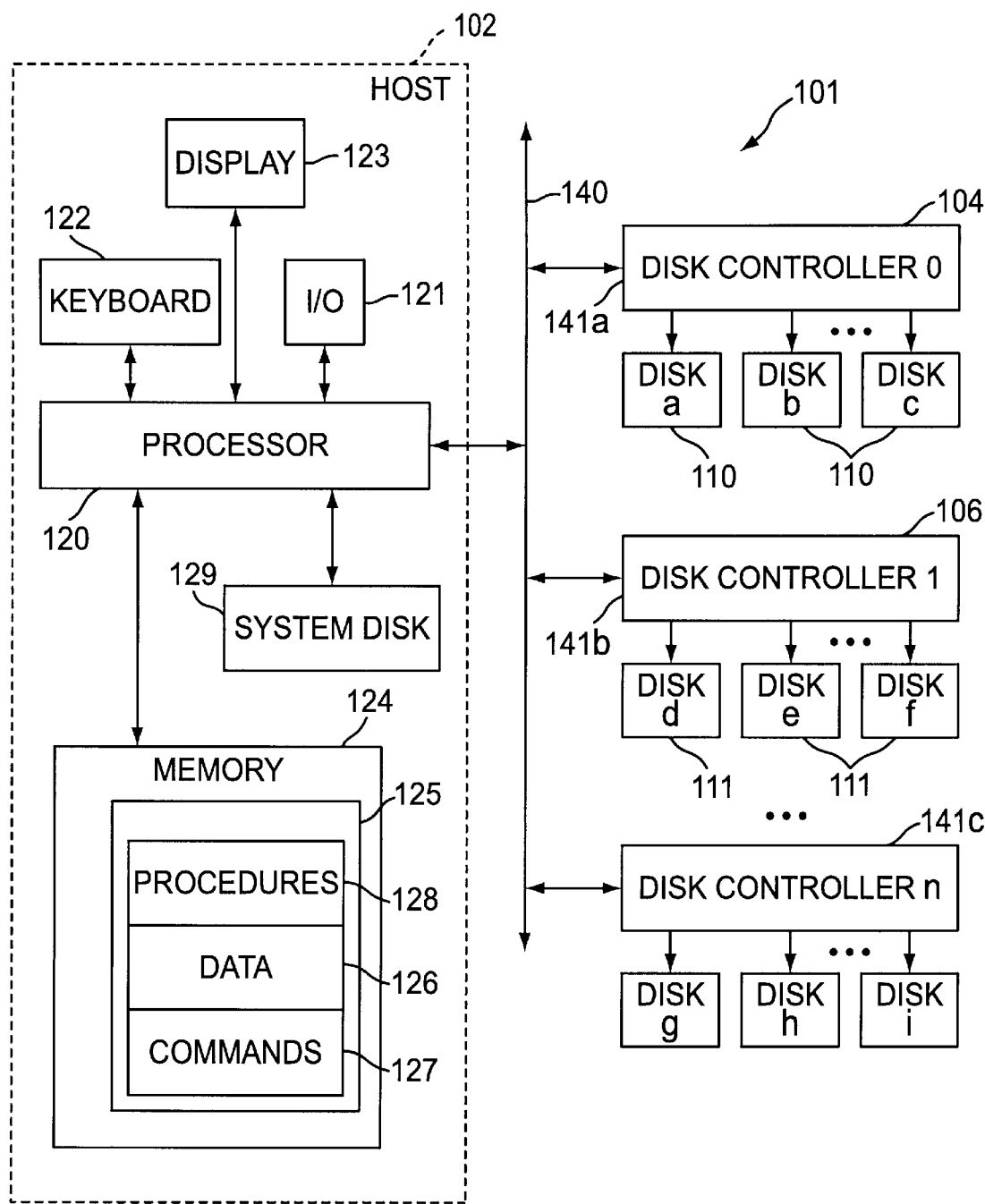
FIG. 1 is a diagrammatic illustration showing a block diagram of an exemplary embodiment of the inventive computer system including the disk array controller and disk drives.

First we describe embodiments of the invention relative to the exemplary computer system illustrated in FIG. 1. As the invention may be practiced With a variety of computer system architectures, the system shown in FIG. 1 is merely exemplary and not limiting, many conventional elements are not shown so that the invention is not obscured by conventional details. An exemplary embodiment of the inventive computer system 101 including a host computer 102, disk array controllers 104, 106 , and arrays of disk drives 110, 111, each array including one or more individual disk drives is illustrated in FIG. 1. Host computer 102 includes a processor 120, input/output devices 121, such as a keyboard 122, display device 123, memory 124 coupled to the processor and having a defined data structure 125 for storing data 126, commands 127, and procedures 128; and a system disk drive 129. Other conventional computer system components may also be provided. The controller is coupled to the processor by a SCSI (Small Computer System Interface) bus or a Fibre Channel interface 140, and the disk drives are coupled to the controller by a SCSI bus or a Fibre Channel interface 141, in conventional manner. While we primarily refer to disk drives or hard disk drives in this description, it should be understood that the invention is applicable to many types of storage media, including but not limited to rotating magnetic disk drives, magneto-optical devices, readable/writable CD's, fixed or removable media, floppy disk drives, and even electronic or solid state storage media.

Figure 2:
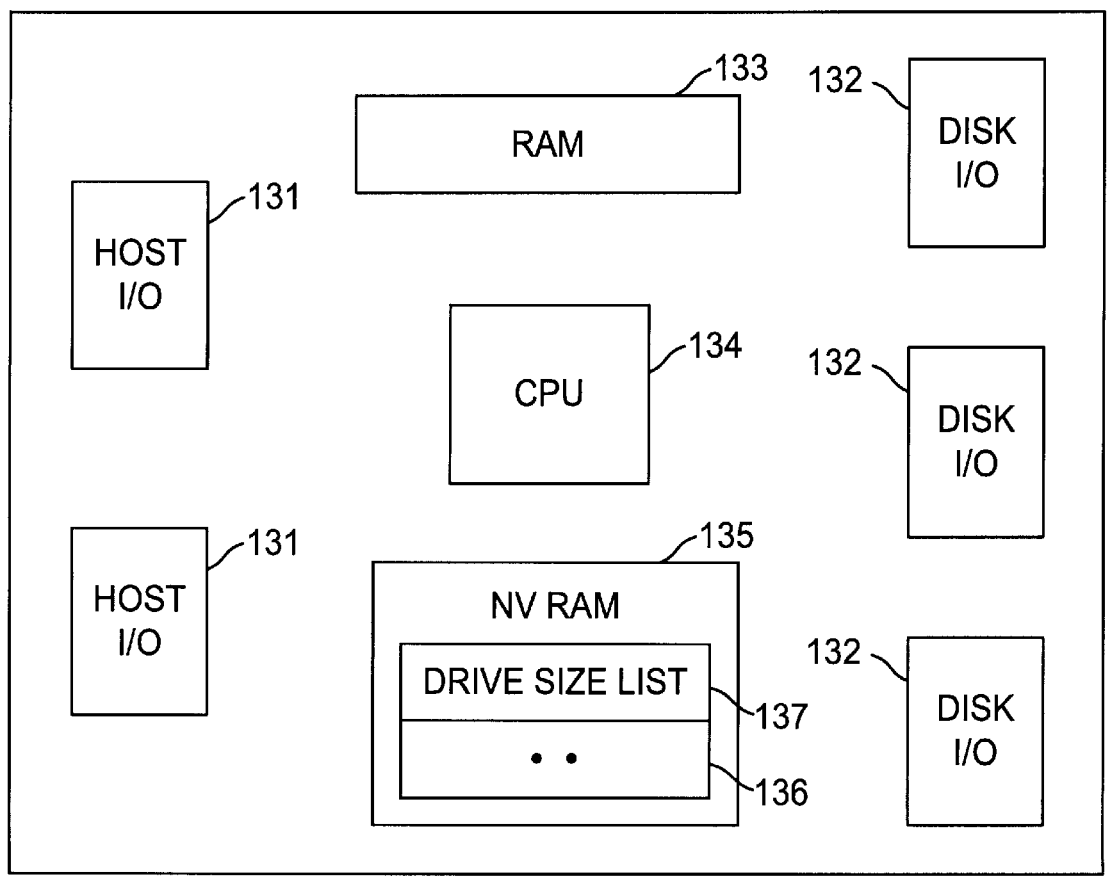
FIG. 2 is a diagrammatic illustration showing a functional block diagram of an exemplary disk controller.

In FIG. 2, there is illustrated a functional block diagram of an exemplary disk controller 130. Disk controller 130 is disposed within an enclosure (not shown) and is typically fabricated as a single printed circuit board. Disk controller 130 includes host input/output (I/O) block 131, disk I/O block 132, RAM 133, CPU 134, and storage means 135 such as a non-volatile memory (NVRAM) 135 in which a Drive Size List data structure may be defined for storing a disk size list 136, the characteristics of which are described in further detail below.

Figure 3:
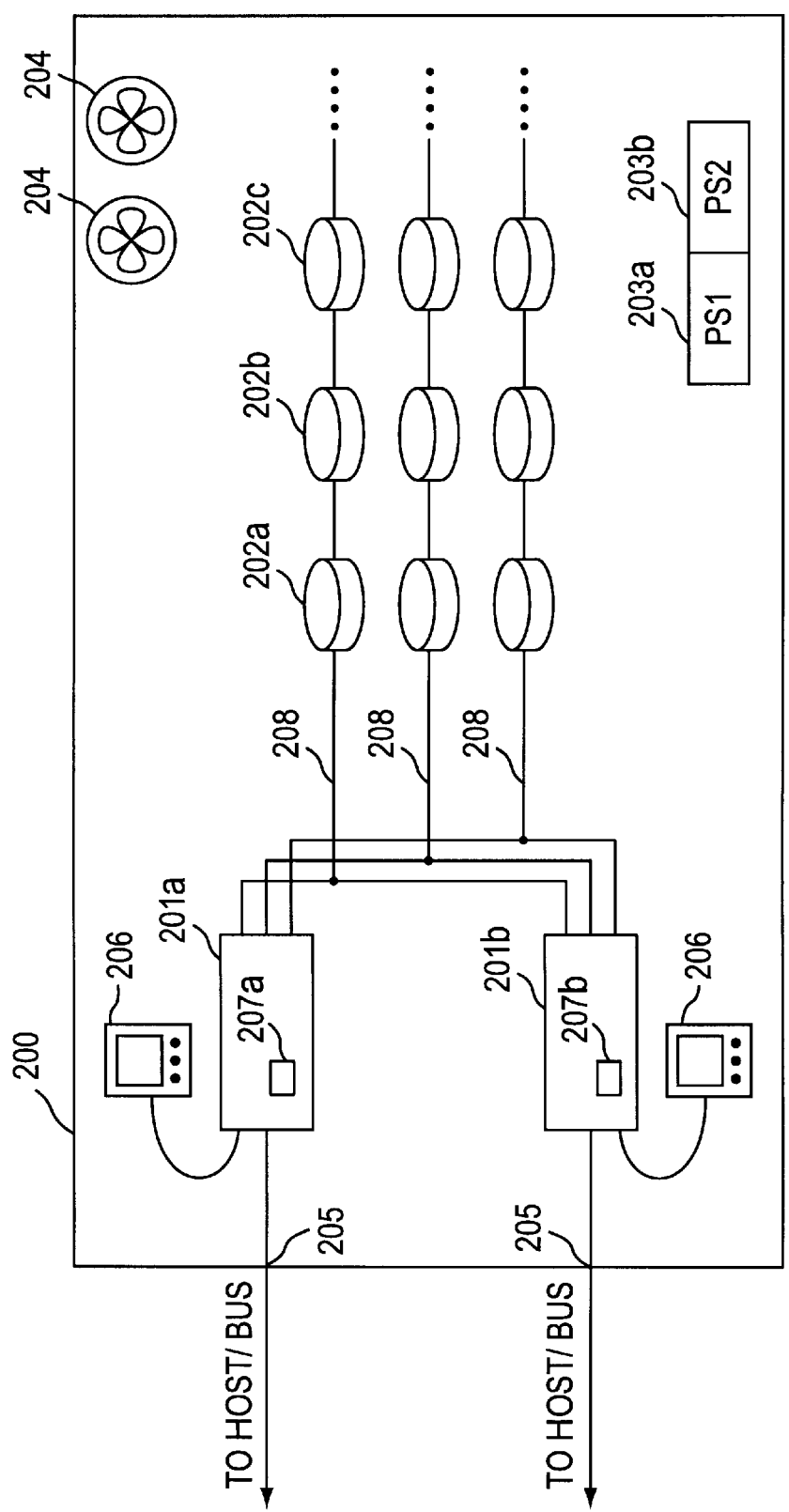
FIG. 3 is a diagrammatic illustration showing a block diagram of an exemplary host-controller-disk drive configuration including non-volatile memory for storing the Drive Size List within the controller.

A two controller structure and its relationship to the host and disk drives is now described relative to the embodiment illustrated in FIG. 3. Enclosure 200 provides enclosing mounting structures for the controllers 201a, 201b, one or more power supplies 203, one or more fans 204, and a plurality of disk drives 202. Controllers 201a, 201b are coupled for communication to the host via host-controller connections 205a, 205b, typically some type of high-speed communication bus, of which many types are conventionally known. Each controller 201a, 201b is interfaced to an external input/output device 206, such as for example a keyboard or keypad, and display such as a Liquid Crystal Display (LCD) or other input/output and display means. In this embodiment of the inventive structure, sets or arrays of disk drives 202 are coupled to each of the two controllers via controller-controller-drive connections, typically a bus, of which many types are conventionally known. Non-volatile memory means, such as non-volatile RAM (NVRAM) 207 is provided in association with each controller for storing the Drive Size List, typically as RAM on each printed circuit board based controller.

The drive size list is a simple array of values. Each value represents the allowed capacity for all the drives whose physical capacity is equal to or greater than that value, and less than the next higher value in the list. The beginning value is appropriate for the smallest present drive. The ending value, if the list is not full, is 0 and is taken to mean an infinite size or a value greater than the largest possible drive. If the list is full, the infinite value is used for the next higher list entry. The list is located in non-volatile memory 135 and is accessible only by the software executing on the controller's CPU 134.

The disk drive arrays 110, 111 each include a plurality of disk drives, but the controller may be configured to control only a single disk drive. More or fewer disk controllers may be provided in the inventive system, for example, a single controller may be configured, or 2, may be configured, in the present embodiment. However, those workers in the art in light of the description provided herein will appreciate that the inventive structure and method may be extended for systems having more than two controllers. Each array of disk drives is disposed in an enclosure as is commonly done for Redundant Array of Independent Disks (RAID) storage configurations.

Drive sizing operates in an external RAID controller environment. That may be either simplex (that is a single (1) controller), or duplex (that is 2 controllers in an active-active mode of operation). The controllers are connected to one or more host computer systems and serve those host systems as a single storage device. The drives connected to the controllers inside the enclosure are configured to appear and perform as a single very large disk drive with the additional benefits of fault tolerance. The controller also provides performance improvement in the form of disk data caching and, in active-active, fault tolerance for controller card failure.

In a first embodiment of the invention, a "drive size list" is put in the controller by way of a software loading procedure and the controller itself does the drive sizing for all disk drives controlled by that controller. In this embodiment, the conventional drive sizing file stored in the host is not used. The inventive Drive Size List need not be based on Inquiry command data retrieved from the drives but is preferably implemented with a simple list of disk drive capacity ranges to be applied to all drives regardless of particular disk drive makes and models.

When the Drive Size List feature is first installed in the disk array controller there will be no Drive Size List; however, the lack of a drive size list is detected by software and a new Drive Size List is generated from the existing Disk Configuration by discovering and incorporating all drives present in the controller system.

After the Drive Size List feature is installed in the controller, and entries for the Drive Size List have been generated there are several means of maintaining the list. Maintenance of the Drive Size List is described relative to the exemplary Drive Size List structure diagrammatically illustrated in Table 1. In Table 1, the left-most column shows the Artificial Capacity entries in the actual Drive Size List. These Artificial Capacity entries are used as the disk drive size entries. In this example, there are five entries, each entry identifying a range of sizes or disk drive storage capacities. For example, the ranges 0x1f000=1000 MB; 0x8e8000= 2000 MB; 0x866000=4300 MB; 0x10cc000=8600 MB; and 0x222e000=17500 MB.

The Drive Size List is a set of ranges. The list may be fully exploited by using the list size to determine the end of the list. The controller uses this Drive Size List to adjust the physical size of every drive connected to the controller. Controllers operating in Tandem keep their lists coherent by means of controller-to-controller messaging. List coherency between active-active controllers is described elsewhere in this specification. Any drives that have a physical size equal to or greater than the first value in the list but less than the next value in the list take on an artificial size corresponding to the first value in the list. And so on until the special case of the list's end and that is treated as a value larger than any possible disk, an infinite value.

This list shows all the values rounded down to a 100 MB boundary, however this is only a convenience and not a requirement. Note that the Artificial Capacity is taken as the new physical capacity of the drive and all space allocations are based on this value. User Data Space, that is space actually available for storing user data, will be computed on the basis of what remains after the Reserved Disk Area (RDA) is subtracted from the Artificial Capacity and the remainder is further rounded down to a RAID Stripe Size boundary (when the disk drive is used for a Striped RAID application). The ranges identified in Table 1, are merely exemplary and illustrative and the ranges may be specified according to the physical capacities of the drives, and a trade-off analysis between the perceived need for a desired number of available spares and the desire to avoid excessive wasted space. In many applications, the desirably of available spares which can readily be brought on-line, over-rides the issue of unused or wasted space.

TABLE 1

Exemplary Drive Size List (Artificial Capacity)

| Artificial Capacity | Physical Capacity | Description |
| --- | --- | --- |
| 0x1f000 = 1000 MB | none qualified | 1 GB or below drives |
| 0x8e8000 = 2000 MB | 0x400C1C = 2049 MB 0x41BD7F = 2103 MB | ~2 GB to ~1 GB drives |
| 0x866000 = 4300 MB | 0x87A25B = 4340 MB | ~4 GB to ~2 GB drives |
| 0x10cc000 = 8600 MB | 0x10f59c7 = 8683 MB | ~9 GB to ~4 GB drives |
| 0x222e000 = 17500 MB | 0x222EE55 = 17501 MB | ~18 GB and above to ~9 GB drives |

An exemplary structure or format for an embodiment of the Drive Size List is now described. A pseudo-code definition of the structure of a Drive Size List is presented below:

```
#define MAX_DRIVE_SIZE_LIST 7
typedef struct
(
    U32 round ;
    U32 entry [MAX13 DRIVE_SIZE_LIST] ;
) DriveSizeList ;
```

The round value, or rounding factor (designated by round in the example), allows for control of the width of the relatively small region occupied by all the drives in a particular capacity range. Drives from different makers and different models from the same makers typically have their capacities clustered together. For example, disk drive manufacturers typically manufacture disk drives in the 2 gigabyte range, 4.5 gigabyte range, 9 gigabyte range, but there actual capacities may vary slightly. A nominal 4.5 gigabyte drive perhaps offering 4350 megabytes, 4490 megabytes, and so forth. The round value is used as a factor applied to a linear or non-linear equation to provide a gap below the smallest drive in a capacity cluster so that additional and somewhat smaller drives may be added to that cluster without the need for a reconfiguration. For example, if the smallest drive configured at one point in time has a capacity of 4590 Megabytes, it is desirable to specify a rounding factor such that if a disk drive in the 4.5 Gigabyte nominal capacity range has an actual capacity of 4350 Megabytes, that disk drive can be readily accommodated without undue effort. The term rounding is used in this connection refers to the action of applying the round member or value. In a preferred embodiment of the invention the round value is applied in a non-linear equation or the equivalent relationship implemented as a look-up table stored in a data structure in a memory store.

The manner in which the rounding is performed may take a variety of forms, and is not important to the invention, except that it is advantageous that the possible future need to configure a disk drive having an actual maximum capacity that is somewhat smaller than the disk drive capacities present at the time of the original configuration be realized by the drive sizing procedure. The rounding could simply be a size offset, or a percentage of size reduction from the smallest drive currently configured in that nominal capacity range, that was arbitrarily selected given knowledge of the typical disc drive capacity range, or some linear or non-linear equation, or a look-up table specifying a suitable minimum size based on the current configuration could be used. Of course, it may be desirable to apply a different offset, percentage reduction, or linear or non-linear rounding equation for the different nominal sized disk drives, that is a different rounding for 2 gigabyte class drives than that applied to 9 gigabyte class drives.

One example of a non-linear equation that may successfully be employed is as follows:

$$( (Cr/2048) \times (Round+Rnd[ ((Cr/2048)/1000)/2]) ) \times 2048$$

where:
    Cr=Capacity from Read Capacity command,
    Round=percentage to keep, such as for example 0.95, 0.99, or other desired fraction or percentage, and
    Rnd=Array of Round Adjustments based on Gigabyte range of Cr.

The adjusted drive size being reduced by a small percentage of the smallest drive in the cluster may also optionally and additionally be adjusted downward to an appropriate megabyte boundary.

The downward adjustment is desirable, because otherwise in the event that a reconfiguration was required using disks slightly smaller than the appropriate entry in the list, would potentially require a tape backup. All the data must be taken off and the disks re-arranged into arrays with enough total capacity for the data but now using a list entry with its value set for the new smaller disk type. The value would again be rounded down. If an array is actually full, then the total array size will have to be increased by adding a disk to the array in order to hold all the data.

Desirably, space for additional drive list entries will be provided for expected drive releases for the expected life of the product. For example, if the RAID array and controller have an expected life span of five years and the disk drives are being improved at an expected rate of every two years, then if there are five disk drive list entries needed at the time the product is released (year zero), then the disk list size should be initially set for seven to permit five entries at the time of release (year zero) and the anticipated added or modified disk drives (year 2 and year 4). These are merely guide lines for consideration and not a requirement of the inventive structure or method. In the event that controller firmware is updated at intervals, each firmware release may advantageously adjust the list size, generally upward, to account for new entries that are or might be needed. As unused entries typically serve no purpose, unused entries, such as for previously used but now out-dated disk drives, may advantageously be removed, such entries may be removed at the time of a controller software of firmware release update. Note that when all of the entries relate to artificial capacities of the disk drives, regeneration from disk is possible as described below.

Having described the benefits, structure, and other features of a disk drive size list, we now describe the manner in which the drive size list is used in a system. The Drive Size List is used by the controller's program whenever a new drive is added to the system. When a drive is added it has no "sizing" and is not part of the disk configuration. The controller will retrieve the drive's Read Capacity size, look up the read capacity size in the Drive Size List, and compare the read capacity size with the size ranges in the list to determine the drive's Artificial Size and mark the drive "sized" in the disk configuration. As provided in one embodiment of the invention, once a drive has been sized, it can be resized only when it is not part of a Disk Configuration (that is, the drive must be physically removed from the enclosure or logically removed from the disk configuration and re-inserted or re-configured). This prevents an actively configured drive from having it's capacity changed while in use One procedure for generating a drive's size from a new disk drive insertion at disk add-in time is described below.

Disk drives which have been discovered and found functional are referred to as "known drives", and such known drives have an entry in a disk configuration structure that marks them as known, known drives have generally been "sized" and retain their Artificial Size. If a drive has somehow been added to the system and has not been "sized" then its disk configuration artificial size number will have the drive's Read Capacity size. If the Artificial Size in the disk configuration is the same as the Read Capacity size then the disk has not been "sized".

We now describe the manner in which Drive Size List is stored in the controller. In one embodiment of the invention, the Drive Size List is stored in the controller's non-volatile memory as two copies; each copy including a checksum and being protected while being written by a write-lock mechanism. While one copy will suffice functionally, two copies are desirable because a list update may be in process at the instant of a power failure and this leaves the list with unknown contents. Similarly, provision of the checksums and write-lock protection, though not essential, are desirable because they serve to detect a write interrupted by a power failure and a failing or otherwise corrupted memory device.

In one embodiment of the invention, the Drive Size Lists are stored in non-volatile memory such that they redundant, impervious to power loss situations and will detect a failing or corrupted memory device. In one embodiment of the invention the Drive Size List has the following form, as indicated by the pseudo-code immediately below:

```
#define MAX_NUM_DRIVE_SIZE_LISTS 2
typedef struct
(
    U32   write_lock ;   // set to 1 while writing, clear when not
    U32   checksum ;
```

*-continued*

```
    DriveSizeList list ;
) nvrDriveSizeArea ;
nvrDriveSizeArea nvrDriveSize[MAX_NUM_DRIVE_SIZE_LISTS];
```

When the controller starts up, it will check the write-lock and checksum for both lists (copies 1 and 2). If either list is locked or has a bad checksum, that bad list will be recovered from the remaining good list. Either list may then be used for Drive Sizing operations. If neither list is good then an error status is set in a data structure retrievable by an external configuration tool and a message is placed on the controller's front panel or otherwise communicated to the user or operator, to signal that operator intervention is required to recover the list. It is possible to recover the list from the existing disk configuration. One procedure for recovering the list by regeneration from the disk is described below. Since the Drive Size List is only used in the event of a new drive being added, the loss of both lists is not catastrophic at all times and its recovery need not be immediate.

The purpose of the write-lock is to protect against the effects of a power failure during the updating of an individual list. The operation is to set the write-lock, write the list data including the checksum, and then to clear the write-lock, for each list. If, at power up time, the controller finds the write-lock set, its set status is taken as a signal that list is corrupted, possibly only half written, and should not be used. Both lists are written this way, one at a time.

Because the list is recoverable (regenerate-able) from an existing disk configuration, it is not necessary to directly store it on disk with the configuration on disk (COD) as the disk configuration is. That would be doubly redundant. The list is already stored redundantly in non-volatile memory and possibly on a partner controller as well.

List coherency between active-active controllers is maintained. Any time the Drive Size List is updated, by any means, it is written to non-volatile memory. If the controller is operating in partnership with another controller that partner controller is sent, using standard conventional controller-to-controller communications procedures, the Drive Size List. The partner controller will then save the Drive Size List into its non-volatile memory. In this way the same information is stored and list coherency is maintained. The inventive Drive Size List may be modified or updated in several ways, including: (i) generation from new disk insertion, (ii) regenerate from disk configuration, (iii) controller local configuration facility, and (iv) direct command from an external configuration tool. Each of these alternative procedures are now described.

Generation from New Disk Insertion. The most frequent need to update the Drive Size List comes from the desire to use the larger capacity hard disk drives as they become available. When this happens the list must have a new larger entry appended to it. In order to use the new larger disk, the user does one thing. He inserts one of the new larger disks into the controller's disk enclosure. The controller senses the new disk insertion by means of enclosure signals and automatically checks it against the Drive Size List. Since the new disk is significantly larger than the largest entry in the current list, the new disk's size (rounded as described above) is added to the list. Here, "significant" refers to the new disk's size being a certain amount or percentage larger than the last (largest) entry in the list. While various rules may be implemented, in one embodiment of the invention, significant is interpreted as being about 25% larger than the last list entry. Because new disk introductions are generally doubling in size of the previous generation, the 25% factor serves to prevent blurring the disk size down to the next smaller value in the list while allowing for disk makers to provide disks with oddly sized capacities. Of course, if desired, the significance threshold could be selected to 10%, 20%, 30%, 50%, or larger or any value between these percentages. Alternatively, it could be defined as any fixed capacity amount above the current largest disk drive, for example, in one, 2, 3, 5, 10, 20, 50, or larger gigabyte increments. In the future one may readily expect that even much larger capacity disk drives or other storage devices may become available, and the inventive structure and method may readily be used with such new storage devices.

In one embodiment of the invention, automatically inserting new disks that have sizes between existing list entries is not allowed. Such intermediate sized drives are "sized" to the next smaller value in the list. While this treatment is not a limitation of the invention, it makes practical sense from an implementation standpoint.

This procedure for Generation from New Disk Insertion only works when there is an open entry in the list. An open entry exists when the list is not full and may be created by clearing an unused size from the list, if it does not already exist. Generation from New Disk Insertion is desirably, though not necessarily, a user controlled feature, and may be enabled or disabled at will.

Regeneration from Disk Configuration. Regeneration of a lost drive size list from the Disk configuration is possible because all the used entries are in the disk configuration as Artificial Capacities. This disk configuration Artificial Capacity member serves several purposes, including: (i) allowing the list to be recovered in the event the list is lost, (ii) allowing the list to be size reduced, that is by squeezing unused entries out, as it will contain only used entries after regeneration, and (iii) allowing the list to be generated from a system previously configured using the conventional "drive sizing file" stored on the host, which can be done automatically with a controller firmware upgrade procedure. The controller firmware upgrade procedure includes the following steps:

(i) Save the disk configuration to off line media;
(ii) download new firmware;
(iii) restart/reboot the controllers;
(iv) if necessary, reload the disk configuration; and
(v) trigger or initiate Drive Size List regeneration either by: (a) manipulation of the front panel controls, or (b) by the use of a write drive size list direct command.

In a preferred embodiment of the invention, dropping old, small sizes from the Drive Size list in the controller is recommended as a means of fully utilizing the list. Midway way through the expected life of a controller a new, larger disk type may become available, and at that time the new larger drive is incorporated, (or anytime) unused list entries may be dropped. The list is ordered from smallest to largest. Dropping a value from the middle is allowed as long as the resulting gap is closed by moving the larger entries down. Recall that the entries define size ranges and that by dropping or deleting an entry, the rules for assigning an Artificial capacity to a drive are effectively changed.

On command, the Drive Size List may be regenerated from the current disk configuration, but in a preferred embodiment of the invention, this operation will only be performed when there is a valid disk configuration, and regeneration of the list is preferably not performed automatically to recover a lost list because of the fact that the list has been lost should be communicated to the user, so that the user can take the most appropriate corrective action.

Regeneration of the drive size list from the current disk configuration involves building an array of potential candidate Drive Size List entries in a temporary memory storage space, for example in memory in the controller using the existing "sized" physical disk's artificial capacity for data. Duplicate artificial capacity values are ignored. The resulting candidate list will have entries for all existing "sized" disks, but may lack some entries from the original (lost) list if some entries were not used by disks currently configured. Removal of these unused entries is actually a benefit, since the culling of unused entries serves to reduce the number of entries used thus making room for the addition of new, larger drives. This procedure may also be used to generate the list from a set of disks that were "sized" using the old style file system, in that the artificial capacities are the only information the controller has to know. The drives have been sized and they are all it needs to regenerate the list. Once the list is built it is saved to non-volatile memory using a local configuration facility save operation. In one embodiment of the invention, a separate "Write Drive Size List direct command" is used to produce and store the regenerated list. This command is described in detail below.

Controller Local Configuration Facility. Updating the Drive Size List from the controller's front panel, if such panel exists, or by other input/outputidisplay means, is done by accessing a special menu within the controller's local configuration facility. This facility usually uses an LCD/keypad as its terminal device but is also capable of using a video terminal over a serial communications line. The facility also has standard methods of displaying data, selecting items, navigating menus, and the like.

The controller's local configuration facility operates on a copy of the controller's list. When changes are complete the copy is given back to the controller and the controller saves it to non-volatile memory and places the new list in service. The Drive Size List menu or equivalent input/output device, or user interaction means, provides several functions, including: Refresh, Display, Clear, Change, Regenerate, and Save. Each of these functions is now described. Of course, while these functions are advantageous in practicing one embodiment of the invention, several of the functions though adding great utility to its use, are not required by the invention.

The "Refresh" function refreshes the local configuration facility's memory copy of the list. This is necessary because the in-service list may be changed by direct command (see description below) while the user is viewing the list copy. Entering the Drive Size List menu from the menu above is equivalent to a Refresh.

The "Display" function displays the current list. If the LCD or other display has limited display capacity, some scrolling or paging may be required to view the entire list of entries.

The "Clear" function clears the entire list. Here the user may zero out the entire list. This function is provided as a convenient starting point prior to using the Change menu to enter a completely new list.

The "Change" function permits a single entry in the list to be modified or changed. Here the user will select a single list entry. The entry is shown in hexadecimal and the user is allowed to change it to any value. In one embodiment of the invention, complaints about list miss-ordering, duplicate entries, or the like conditions or errors are ignored until the Save operation. Change has four sub-operations: (i) Select allows a single entry to be selected, and is required in the preferred embodiment of the invention; (ii) Change allows the selected entry to be modified; (iii) Insert allows a new entry to be inserted ahead of the selected entry; and (iv) Delete allows the selected entry to be removed. A terminal entry, that is a value larger than any possible drive size represented by the value 0, and is automatically maintained if all entries are not otherwise used.

The "Regenerate" function, regenerates the list from Disk. This causes the controller to access the current disk configuration in the controller and build a new list based on that information. In the language of Unix it provides a basic "grep|sort|uniq" of type of operation. The list need not be non-existent for this function to be used.

The "Save" function saves the list to non-volatile memory. This operation will fail if the controller's list is changed while the user changes the local configuration facility's image of the list. A prompt will be presented to the user in order to provide the user with and option to let the save progress to completion anyway. The operation is to verify the list has no errors, such as out of order entries, and then pass the list to the controller for use as it's new list, and to trigger the controller to save the new list in non-volatile memory (two copies), and also pass the list to the partner controller if there is one. A completion status is presented.

Those workers in the art will realize in conjunction with this description, that the above described functions, particular implementation details, and options are advantageous, but not required to implement the fundamental features of the invention. Rather the detailed functionality and user interface are described in the context of a preferred embodiment of the invention and to disclose one of the better implementations of the invention.

Two so called "direct commands" are now described and provide functionality for modifying or updating the Drive Size List from a configuration tool, including for example, a host based configuration tool. The read and write direct commands described here are specialized commands designed expressly for reading from the inventive Drive Size List and for writing to the inventive Drive Size List. By specialized commands we mean, for example, SCSI commands that use vendor unique or non-standard op code values. These commands operate to (i) read the current list, change the list to reflect the new drive type to be used, or write the list back into the controller. Specific embodiments of the two commands are described in additional detail immediately below.

The "Read Drive Size Direct Command" is used to retrieve the controller's Drive Size List. The data returned by this command may be written to the controller with the Write Drive Size List command. An exemplary format of the Read Drive Size List Command Descriptor Block is listed in Table 2. In this Descriptor Block, LUN is the Logical Unit Number (typically not used), Operation Code represents the vendor Unique command value, DCMD OP CODE specifies the action of this particular vendor (manufacturer) unique command. Allocation Length (Bytes 7 and 8) is the size of the expected data, the Control Byte (Byte 9) is always 0, and the reserved bytes or bits are always 0, for the purpose of this procedure.

The Error Conditions Code for the Read Drive Size Direct Command, which is issued when no list is available is listed in Table 3, and the Data Format is listed in Table 4. The entry for Number of following bytes in Table 4, refers to the size of the Drive Size List structure. Host configuration tools may set the Allocation Length to 4, issue the command to read this size and then reissue the command with the allocation length adjusted to the proper value to retrieve the entire DriveSizeList structure plus the 4 bytes containing the number of following bytes. The DriveSizeList structure in Table 4, refers to the structure described above under Drive Size List Format.

The Write Drive Size Direct Command is provided to write the controller's internal Drive Size List. The format of its Descriptor Block is listed in Table 5. The List Operation is "0" to simply write the command data into the controller's list. If List Operation is set to "1" and the allocation length is "0" then the controller will recover its Drive Size List from the disk configuration data for the existing drives. The Number of following bytes, indicates the size of the Drive Size List structure. It should be the same as that retrieved by the Read Drive Size List command. The Drive Size List structure is the structure described above under Drive Size List Format. The entry and rounding values may be changed as needed to remove, change or add entries. Its size may not be changed. In the preferred embodiment of the invention, the following four rules apply to the format of the Drive Size List structure: (i) The round value must be less than the smallest entry; (ii) Entries must be in increasing order; (iii) There must be a "0" valued entry for the terminal entry if all list entries are not used otherwise; and (iv) An "in use" entry must not be removed., where entries are in use if any drive in the current disk configuration has been "sized". (This error may be overcome by clearing the disk configuration.)

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

TABLE 2

Read Drive Size List Command Descriptor Block

| Byte | Bit | | | | | | | |
|---|---|---|---|---|---|---|---|---|
| | 7 | 6 | 5 | 4 | 3 | 2 | 1 | 0 |
| 0 | Operation Code (20h) | | | | | | | |
| 1 | LUN | | | Reserved | | | | |
| 2 | DCMD OP CODE - Read Drive Size List | | | | | | | |
| 3 | Reserved | | | | | | | |
| 4 | Reserved | | | | | | | |
| 5 | Reserved | | | | | | | |
| 6 | Reserved | | | | | | | |
| 7 | Allocation Length | | | | | | | |
| 8 | Allocation Length | | | | | | | |
| 9 | Control Byte | | | | | | | |

TABLE 3

Error Conditions

| Sense Key | ASC | ASCQ | Description |
|---|---|---|---|
| 09h | 80h | 61h | No list available |

TABLE 4

Data Format

| Byte | Value |
|---|---|
| 0–3 | number of following bytes |
| 4–(n-4) | DriveSizeList structure |

TABLE 5

Write Drive Size List Command Descriptor Block

| Byte | Bit 7 | 6 | 5 | 4 | 3 | 2 | 1 | 0 |
|---|---|---|---|---|---|---|---|---|
| 0 | Operation Code (20h) | | | | | | | |
| 1 | LUN | | | Reserved | | | | |
| 2 | DCMD OP CODE - Write Drive Size List | | | | | | | |
| 3 | List Operation | | | | | | | |
| 4 | Reserved | | | | | | | |
| 5 | Reserved | | | | | | | |
| 6 | Reserved | | | | | | | |
| 7 | Allocation Length | | | | | | | |
| 8 | Allocation Length | | | | | | | |
| 9 | Control Byte | | | | | | | |

TABLE 6

Error Conditions

| Sense Key | ASC | ASCQ | Description |
|---|---|---|---|
| 09h | 80h | 62h | Entries not in order |
| 09h | 80h | 63h | Rounding out of range |
| 09h | 80h | 64h | Entries out of range |
| 09h | 80h | 65h | "number of following bytes" not same as read |
| 09h | 80h | 66h | Attempt to remove "in use" entry |

TABLE 7

Data Format

| Byte | Value |
|---|---|
| 0–3 | number of following bytes |
| 4–(n-4) | DriveSizeList structure |

What is claimed is:

1. A method for sizing disk drives connected to a disk drive controller, comprising:

writing a plurality of entries to a drive size list in a memory store, said list entries representing drive size ranges, said drive size list stored in memory associated with the disk controller and accessible only within said controller during operation;

said drive size list comprising a simple array of numerical drive size values;

each said numerical drive size value representing the allowed capacity for all the drives whose physical capacity is equal to or greater than that numerical drive size value and less than a next higher value in said drive size list;

a first entry in said drive size list is a beginning value appropriate for the smallest disk drive present and;

an ending entry in said drive size list includes a symbol interpreted to mean a value greater than the largest possible disk drive that can be configured.

2. The controller device in claim 1, further comprising a plurality of disk drives coupled to said controller.

3. The method in claim 1, wherein said drive size list may be modified by, (i) generation from new disk insertion, (ii) regeneration from a current disk configuration, (iii) generation by a controller local configuration facility, or (iv) generation with a direct command from an external configuration tool.

4. A hard disk drive controller device for use with a computer system and at least one disk drive comprising:

a host input/output block;

a disk input/output block;

random access memory;

a processor; and storage means in which a disk drive size list data structure is defined for storing a disk drive size list having an array of numerical disk drive size values, each said numerical disk drive size value in the array representing the allowed capacity for disk drives whose physical storage capacity is greater than or equal to that numerical drive size value and less than a next higher value in said disk drive size list.

5. The controller device in claim 4, wherein said storage means comprises non-volatile memory located on a printed circuit board that also carries said host input/output block, said disk input/output block, said random access memory, and said processor.

6. The hard disk drive controller device in claim 4, wherein:

a first entry in said disk drive size list is a beginning value appropriate for the smallest disk drive present; and an ending entry in said disk drive size list includes a symbol interpreted to mean a value greater than the largest possible disk drive that can be configured.

7. The hard disk drive controller device in claim 4, wherein said storage means comprises non-volatile memory located on a single printed circuit board that also carries said host input/output block, said disk input/output block, said random access memory, and said processor, and wherein:

a first entry in said disk drive size list is associated with the smallest disk drive present; and a second entry in said disk drive size list includes a symbol interpreted to mean a value greater than the largest disk drive that can be configured.

8. The hard disk drive controller device in claim 4, wherein said storage means comprises a solid-state memory.

9. The hard disk drive controller device in claim 4, wherein said storage means comprises non-volatile memory.

10. A hard disk drive controller device for use with a computer system and at least one disk drive, said controller device comprising:

a host input/output unit;

a disk drive input/output unit;

a random access memory;

a processor; and storage means defining a disk drive size list data structure for storing a disk drive size list having an array of numerical disk drive size values, each numerical disk drive size value representing the allowed capacity for all the disk drives whose physical capacity is equal to or greater than that numerical value and less than a next higher value in said drive size list.

11. A data storage system comprising:
at least a first disk drive controller coupled for communication to a host computer via a host-controller communication bus, said each disk drive controller being interfaced to an external input/output device;
a plurality of disk drives, each said disk drive coupled to said each controller via controller-controller-disk drive connections; and
non-volatile memory means associated with said each controller for storing a drive size list;
said drive size list comprising a simple array of numerical drive size values, each numerical drive size value representing the allowed capacity for all the drives whose storage capacity is equal to or greater than that numerical value and less than a next higher numerical drive size value in said drive size list.

12. The data storage system in claim 11, wherein a first entry in said drive size list data structure is a beginning value appropriate for the smallest disk drive present in the data storage system, and an ending entry in said drive size list is a symbol interpreted to mean a value greater than the largest possible disk drive that can be configured on said data storage system.

13. The data storage system in claim 12, wherein said disk size file is defined in non-volatile memory and is accessible only by software/firmware executing on a processor co-located with said controller.

14. The data storage system in claim 11, wherein said at least one controller comprises a first disk drive controller and a second disk drive controller, said first and second disk drive controllers coupled for communication to a host computer via a host-controller communication bus.

15. A data structure defined in memory of a disk controller comprising:
a disk size list, said drive size list comprising a simple array of numerical drive size values;
each said numerical drive size value representing the allowed capacity for all the drives whose physical capacity is equal to or greater than that numerical value and less than the next higher value in said drive size list;
a first entry in said drive size list data structure is a beginning value appropriate for the smallest disk drive present; and
an ending entry in said drive size list is a symbol interpreted to mean a value greater than the largest possible disk drive that can be configured.

16. A computer program product for use in conjunction with a computer system having a processor and a memory coupled to the processor and at least one disk drive storage device, the computer program product comprising a computer readable storage medium and a computer program mechanism embedded therein, the computer program mechanism, comprising:
a program module that directs a disk drive controller and at least one of said disk drive storage devices to function in a specified manner to size disk drives coupled to the controller, the program module including instructions for:
writing a plurality of entries to a drive size list in a memory store;
said drive size list entries representing drive storage size ranges;
said drive size list stored in memory associated with said disk controller and accessible only within said controller during operation;
said drive size list comprising a plurality of numerical drive size values, each said numerical drive size value representing an allowed capacity for drives whose physical storage capacity is equal to or greater than that numerical drive size value and less than a next higher value in said drive size list;
a first entry in said drive size list being a beginning size value appropriate for the smallest disk drive present; and
an ending entry in said drive size list includes a symbol interpreted to mean a value greater than the largest possible disk drive size that can be configured.

17. The computer program product in claim 16, wherein said program module further includes at least one instruction for modifying said drive size list in said memory store.

18. The computer program product in claim 17, wherein said at least one instruction for modifying said drive size list comprises an instruction generating said drive size list in response to a new disk drive insertion to said computer system.

19. The computer program product in claim 17, wherein said at least one instruction for modifying said drive size list comprises an instruction generating said drive size list in response to regenerating from a current disk configuration.

20. The computer program product in claim 17, wherein said at least one instruction for modifying said drive size list comprises an instruction generating said drive size list in response to a local configuration utility program.

21. The computer program product in claim 17, wherein said at least one instruction for modifying said drive size list is selected from the group of instructions consisting of: (i) an instruction generating from new disk insertion, (ii) an instruction regenerating from a current disk configuration, (iii) an instruction generating by a controller local configuration facility, (iv) an instruction generating with a direct command from an external configuration tool.

22. A disk drive storage subsystem controller for controlling input/output with a host computer and a disk drive based storage subsystem, said controller being of the type having a processor and memory coupled to the processor, an interface for communicating with a host computer, and an interface for communicating with said disk drive based storage subsystem, said controller characterized in that:
said controller includes a disk drive size list data structure defined in a memory and storing a disk drive size list having an array of numerical disk drive size values, each said numerical disk drive size value in the array representing the allowed capacity for disk drives whose information storage capacity is greater than or equal to that numerical drive size value and less than a next higher value in said disk drive size list.

23. In a disk drive storage subsystem controller for controlling input/output with a host computer and a disk drive based storage subsystem, said controller being of the type having a processor and memory coupled to the processor, an interface for communicating with a host computer, and an interface for communicating with said disk drive based storage subsystem, a method for sizing a disk drive, said method characterized in that said method includes steps of:
defining a disk drive size list data structure in a memory;
storing a disk drive size list having an array of numerical disk drive size values wherein each said numerical disk drive size value in the array representing the allowed capacity for disk drives whose information storage capacity is greater than or equal to that numerical drive size value and less than a next higher value in said disk drive size list; and selecting a disk drive size based on said disk drive size list and a disk drive information storage capacity of a disk drive to be configured in the storage subsystem.

24. The method in claim 23, further characterized in that said storing a disk drive size list includes storing a first entry as beginning value appropriate for the smallest disk drive present; and storing an ending entry as a value greater than the largest possible disk drive that can be configured.

* * * * *